United States Patent [19]

Stensby

[11] Patent Number: 5,050,899

[45] Date of Patent: Sep. 24, 1991

[54] MEDICAL CRASH-CHAIR AND TREATMENT TABLE

[76] Inventor: Harold F. Stensby, Rt. 4, Box 1075, Berryville, Ak. 72616

[21] Appl. No.: 549,079

[22] Filed: Jul. 6, 1990

[51] Int. Cl.5 .......................... B62M 1/14; A61G 7/10

[52] U.S. Cl. .............................. 280/250.1; 280/304.1; 280/648; 297/DIG. 4; 5/81 R

[58] Field of Search .................. 280/250.1, 304.1, 643, 280/648, 657; 297/DIG. 4; 5/81 R, 81 B

[56] References Cited

U.S. PATENT DOCUMENTS

| | | | |
|---|---|---|---|
| 2,682,913 | 7/1954 | Scheide | 297/87 |
| 2,694,437 | 11/1954 | Glaser | 280/657 |
| 2,869,614 | 1/1959 | Wamsley | 280/230 |
| 3,083,999 | 4/1963 | Silva | 297/286 |
| 3,147,039 | 9/1964 | Smith et al. | 5/81 R X |
| 3,495,869 | 2/1970 | Ingemansson | 5/81 R |
| 3,837,635 | 9/1974 | Long et al. | 269/325 |
| 3,936,893 | 2/1976 | Anderson et al. | 5/81 R |
| 4,021,028 | 5/1977 | Weber et al. | 269/325 |
| 4,079,990 | 3/1978 | McMunn et al. | 297/DIG. 4 X |
| 4,103,170 | 7/1978 | Spradlin | 250/451 |
| 4,193,147 | 3/1980 | Fischer | 297/DIG. 4 X |
| 4,285,541 | 8/1981 | Onishi | 297/DIG. 4 |
| 4,667,354 | 5/1987 | Carey, Jr. et al. | 5/72 |
| 4,691,962 | 9/1987 | Holdt | 297/DIG. 4 X |
| 4,717,169 | 1/1988 | Shaffer | 280/250.1 X |
| 4,797,960 | 1/1989 | Vaiana et al. | 5/81 R |
| 4,997,200 | 3/1991 | Earls | 280/304.1 X |

*Primary Examiner*—Charles A. Marmor

*Assistant Examiner*—Kevin Hurley

*Attorney, Agent, or Firm*—Shlesinger, Arkwright & Garvey

[57] ABSTRACT

A convertible chair particularly adapted for medical emergencies in that the chair may be adjusted to form a gurney for transporting a patient. The convertible chair includes a reclining backrest portion mechanically linked to an extension. The seat is slideably mounted on a base frame.

11 Claims, 4 Drawing Sheets

FIG. 4
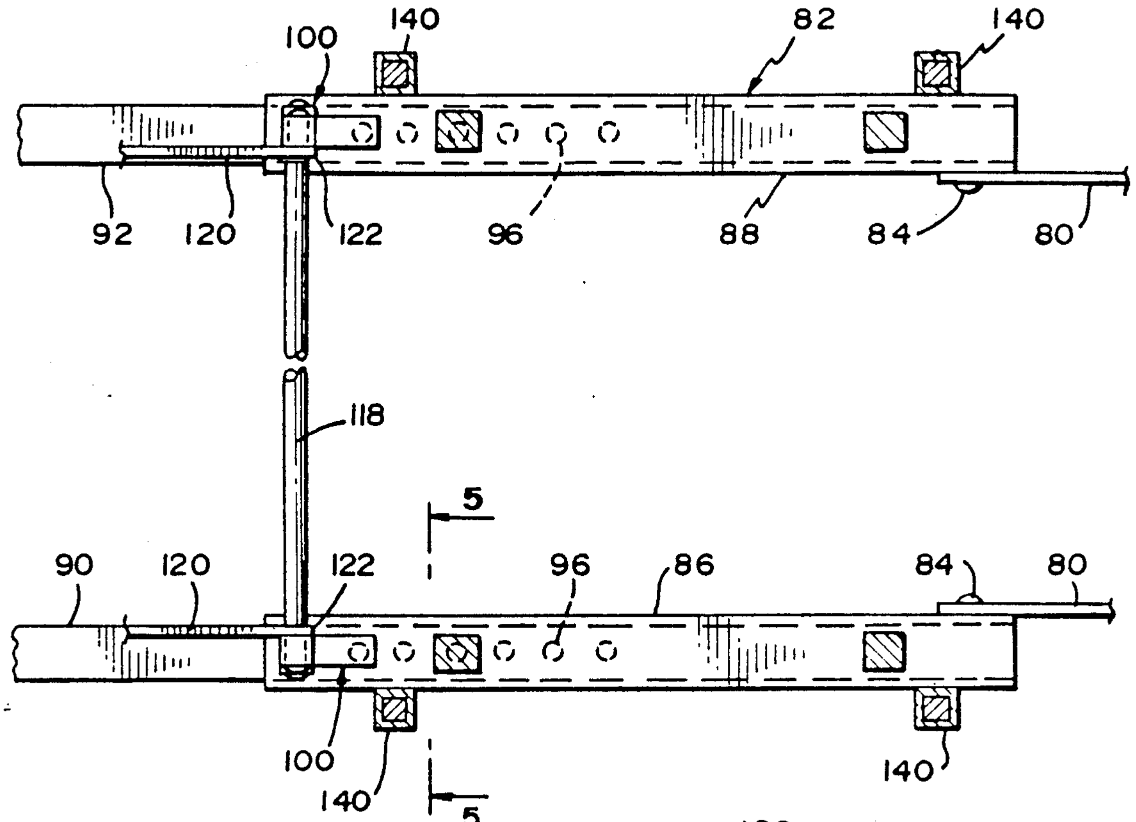
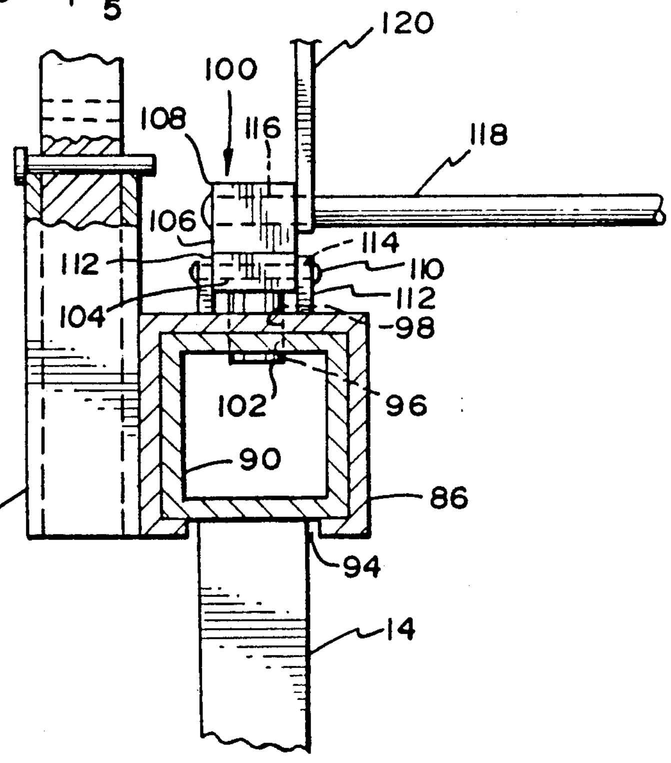
FIG. 5

MEDICAL CRASH-CHAIR AND TREATMENT TABLE

FIELD OF THE INVENTION

This invention relates to a combination wheelchair and treatment table for use in medical testing environments. For convenience and brevity the device will be hereinafter referred to as a convertible chair.

BACKGROUND OF THE INVENTION

In the medical testing environment, particularly when a patient is required to undergo stress testing on a treadmill, the patient is frequently tested to the point of exhaustion. When this point is reached, the patient may collapse and will require the assistance of the attendants to reach a wheelchair or a stretcher. Typically, gurneys and wheelchairs have narrow wheel bases and the chair or gurney is placed at the foot of the treadmill. When the patient collapses attendants are needed to carry the patient back to the wheelchair or gurney.

Wheelchairs are most often used in this situation since the patient is not expected to reach the point of collapse. However, when this point of exhaustion is reached, it is difficult for the attendants to move the patient back to the chair particularly when monitoring electrodes and tubes are attached to the patient.

Those skilled in the art will appreciate that there is a need for a convertible chair permitting the support portion thereof to be moved over the foot of a treadmill so that the testing subject will not have far to move upon total collapse and that the backrest also provides a solid surface for performing cardiopulmonary resusitation (CPR) should the patient go into cardiac arrest.

OBJECTS AND SUMMARY OF THE INVENTION

Accordingly, the present invention has been made to achieve the following objects:

An object of the invention is to provide a convertible chair having the necessary features to facilitate conversion from a chair to a treatment table and vice versa.

Another object of the invention is to provide a convertible chair having a wheel base of sufficient width to straddle a treadmill.

A further object of the invention is to provide a solid flat surface upon which cardiopulmonary resusitation (CPR) may be performed when the chair is converted to a treatment table.

Yet another object of the invention is to provide a quickly deflatable backrest for providing a solid base for CPR.

In summary, therefore, this invention is directed to a convertible chair for use in a medically related environment. The convertible chair preferably includes a movable backrest and extension member and a slidable seat portion. The backrest is movable from an inclined position to a substantially horizontal position so that a patient may sit when the invention is configured in the chair position and may lie down when the invention is converted to a treatment table.

These and other objects and advantages of the invention will be readily apparent in view of the following description and drawings of the above-described invention.

BRIEF DESCRIPTION OF THE DRAWINGS

The above and other objects and advantages and novel features will be apparent in view of the following detailed description of the preferred embodiment of the invention illustrated in the accompanying drawings, wherein:

FIG. 4 is a top plan view of the slidable seat frame connected to the base frame having portions broken away; and, FIG. 5 is a cross-sectional view taken along line 5—5 of FIG. 4 showing the slidable sleeve and locking pin structure.

DETAILED DESCRIPTION OF THE INVENTION

Figure 1:
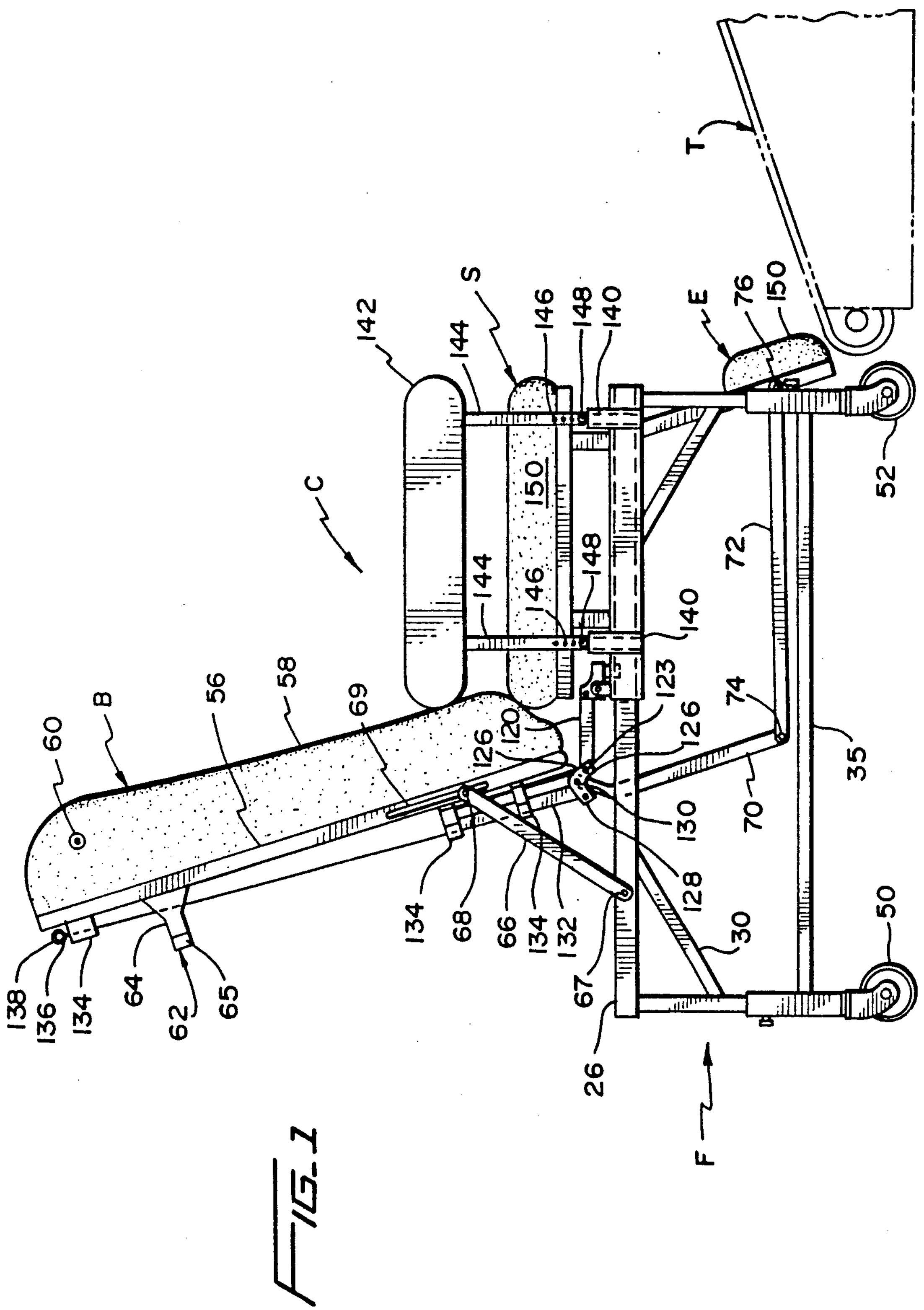
FIG. 1 is a side elevational view of the convertible chair having the backrest in the upright position.
Figure 2:
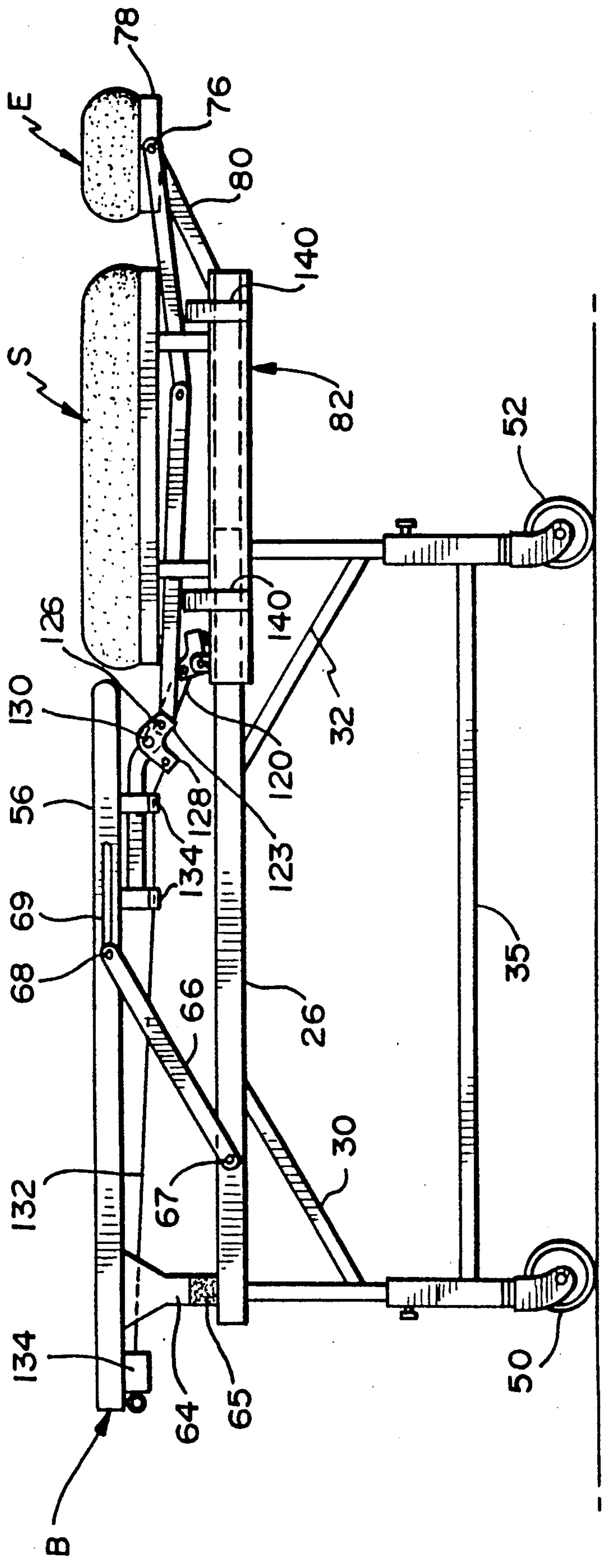
FIG. 2 is a side elevational view of the convertible chair with the backrest folded down forming a treatment table.

Referring to the drawings and more particularly FIGS. 1 and 2, a convertible chair C is shown in FIG. 1 having the backrest B in the upright position and in FIG. 2 having the backrest B in the reclined position. The backrest B and extension E and seat S are all movably mounted with respect to base frame F.

Figure 3:
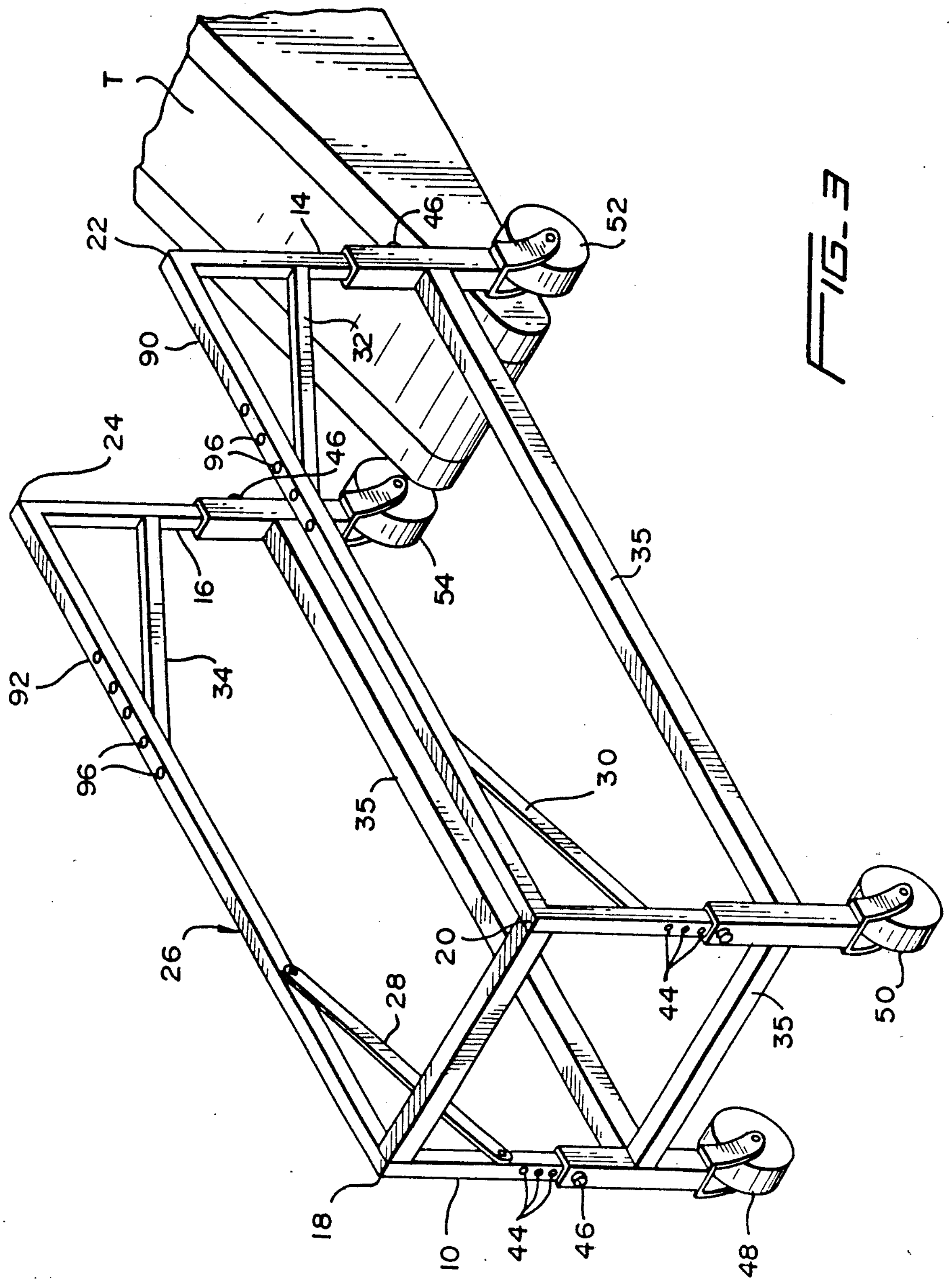
FIG. 3 is a perspective view of the base frame of the convertible chair.

Base frame F as best shown in FIG. 3 includes four generally vertically supporting legs 10, 12, 14 and 16 each of which are connected at one of the corners 18, 20, 22 and 24, respectively of horizontally disposed U-shaped frame 26. Support braces 28, 30, 32 and 34 extend between U-shaped frame 26 and supporting legs 10, 12, 14 and 16, respectively, to add rigidity to base frame F. Horizontal frame members 35 provide additional stability to the base frame F.

Each of supporting legs 10, 12, 14 and 16 fit slidably into support sleeves 36, 38, 40 and 42, respectively. Each of legs 10, 12, 14 and 16 include a plurality of vertically spaced adjustment holes 44 which are sized to receive a pin 46 so that each of legs 10, 12, 14 and 16 may be locked in the desired vertical position. Upon release of pin 46, each of legs 10, 12, 14 and 16 may be raised or lowered in telescoping fashion with respect to support sleeves 36, 38, 40 and 42 to vary the height of U-shaped frame 26 relative to the floor.

Pivoting wheel assemblies 48, 50, 52 and 54 are joined at the base of each support sleeve 36, 38, 40, and 42, respectively, which allow convertible chair C to be easily moved about.

A treadmill T is best shown in FIGS. 1 and 3. In the preferred embodiment of the convertible chair C, legs 14 and 16 are spaced apart a sufficient width so that wheel assemblies 52 and 54 may be rolled up to either side of treadmill T allowing the chair C to be brought up immediately behind a patient exercising on the treadmill T so that in the event of a collapse, the patient may be lowered immediately onto seat S.

As best shown in FIGS. 1 and 2, backrest B is movable from an inclined position as shown in FIG. 1 to a substantially horizontal position as shown in FIG. 2. Backrest B includes a substantially rigid rectangular back board 56 which provides a solid surface in the substantially horizontal position shown in FIG. 2 for performing CPR on a patient in cardiac arrest. Attached to back board 56 is an inflatable air cushion 58 which, when inflated, will prevent injury to a patient collapsing into the chair.

Should cardiac arrest occur and CPR is required, air cushion 58 may be immediately deflated by opening inflation/deflation valve 60 which would allow air to escape and cause air cushion 58 to deflate. Air cushion 58 may be inflated either orally or by using a high pressure air inflation device such as a pump (not shown). Air cushion 58 includes material such as cloth covering the outside thereof to provide some insulation between the patient and back board 56 which may be preferably constructed of aluminum for strength and light weight.

When backrest B is pivoted to the substantially horizontal position as shown in FIG. 2, back board 56 is supported by handle 62 which rests on horizontal frame 26. Handle 62 includes a central push-bar 64 extending across back board 56. Handle 62 also includes resilient bumpers 65 which cushion the impact on back board 56 when handle 62 contacts horizontal frame 26.

A pair of pivotally mounted support bars 66 (only one support base is shown in FIGS. 1 and 2 for simplicity) prevent side-to-side movement of back board 56 as it is pivoted from an upright position to the substantially horizontal position. Support bars 66 are pivotably mounted by pivot pins 67 and 68 at each end thereof. A slot 69 is formed along the side of back board 56 allowing pin 68 to slide relative to back board 56 when back board 56 is moved from the inclined position to the substantially horizontal position.

When backrest B is pivoted from the upright position to the substantially horizontal position, two pairs of linkage bars 70 and 72 are caused to move. Only one set of linkage bars 70 and 72 is shown in FIGS. 1 and 2 for simplicity. Each linkage bar 70 forms a stretched Z configuration to fit beneath seat S in the substantially horizontal configuration and is fixedly attached to back board 56 and is pivotally connected to linkage bar 72 at pivot pin 74. Linkage bar 72 is connected to extension E by a pivot pin 76 connected to the extension base 78. Another pair of linkage bars 80 are connected to extension base 78 by pivot pins 76 and each bar 80 extends from pivot pin 76 to sliding seat frame 82. Linkage bars 80 are connected to sliding seat frame 82 by pivot pins 84 as best shown in FIG. 3.

Sliding seat frame 82 includes two hollow sleeves 86 and 88 which slidably engage elongated arms 90 and 92, respectively, of horizontal frame 26. Pivot pins 84 are mounted on each of hollow sleeves 86 and 88, but do not restrict sliding movement of sleeves 86 and 88 relative to elongated arms 90 and 92.

FIG. 5 is a cross-sectional view taken along line 5—5 of FIG. 4 showing an exemplary view of the bottom opening 94 of hollow sleeve 86. A cross-sectional view taken along the same line of hollow sleeve 88 would appear as a mirror image of FIG. 5.

Bottom opening 94 allows hollow sleeves 86 and 88 to slide over corners 22 and 24, respectively as well as braces 32 and 34, respectively of base frame F.

Elongated arms 90 and 92 each include a series of locking holes 96, preferably uniformly spaced thereon and are best shown in FIG. 3. A locking hole 98 is located in each of hollow sleeves 86 and 88, and each locking hole 98 is are preferably of complementary size and shape to each of locking holes 96.

When sleeves 86 and 88 slide over elongated arms 90 and 92, respectively, locking holes 96 are alignable under locking holes 98 on sleeves 86 and 88 as shown in FIG. 4.

The pivotable locking pin assembly 100 as shown in FIG. 5 is selectively engageable with locking holes 96 and 98 to prevent relative movement between elongated arm 90 and its respective hollow sleeve 86. Each locking pin assembly 100 includes a pivoting locking pin 102 which enters into one of locking holes 96 on an elongated arm 90 as well as through one of locking holes 98 on hollow sleeve 86. Each locking pin 102 extends downwardly from one arm 104 of L-shaped member 106 as best shown in profile in FIGS. 1 and 2. Other arm 108 of L-shaped member 106 extends, preferably at an angle of about 90°, from arm 104. A pivot pin 110 extends through L-shaped member 106 at the intersection of arm 104 with arm 108. Each pivot pin 110 is held in place to its respective hollow sleeve 86 or 88 by a pair of ears 112 fixed to its respective hollow sleeve 86 or 88. Each of ears 112 includes a passage 114 therein for a pivotable engagement with pivot pin 110.

Arm 108 of L-shaped member 106 includes a transverse hole 116 for engaging cross bar 118. Cross bar 118 allows L-shaped members 106 mounted on each of hollow sleeves 86 and 88 to be pivoted around pivot pins 110 simultaneously upon rearward movement of linkage 120. Linkage 120 is preferably a rigid member and is connected at end 122 to cross bar 118 and is connected at its other end 123 to one arm 124 of L-shaped member 126. L-shaped member 126 is pivotally connected at the intersection of first leg 124 and second leg 128 to linkage bar 70 by pivot pin 130. Second leg 128 of L-shaped member 126 is connected to a linkage member 132. Linkage member 132 extends from L-shaped member 126 through guides 134 which support linkage member 132 relative to linkage bar 70.

Release handle 136 is mounted at the end of linkage member 132 and includes an enlarged knob 138 to facilitate grasping thereof.

A pair of armrest support tubes 140 are fixedly attached a vertical orientation to each of hollow sleeves 86 and 88. Each armrest 142 includes a pair armrest support rods 144 which are sized to extend into support tubes 140. Support rods 144 each include a series of holes 146 for receiving a pin 148 to position rod 144 in tube 140 thereby allowing for vertical adjustment of armrest 142.

The seat S and extension E are each preferably covered with a cushion 150 of cloth-covered foam rubber to provide a comfortable pad for sitting upon and resting of the legs upon. All frame members are preferably constructed of rigid metal or other conventional chair construction materials.

OPERATION

The operation of the convertible chair C is best illustrated in FIGS. 1 and 2. As shown in FIG. 1, the convertible chair C may be wheeled up to the treadmill T until the front wheel assemblies 52 and 54 straddle either side of treadmill T. When conversion of the convertible chair C from the chair position shown in FIG. 1 to the gurney or treatment table position shown in FIG. 2 is desired, the attendant grasps handle 136 and pulls. The pulling action is transferred through L-shaped member 126 to cause movement of linkage 120 rearwardly. The rearward motion of linkage 120 causes L-shaped member 106 to pivot about pivot pin 110 causing locking pin 102 to be lifted entirely out of arm locking hole 96 which allows sliding seat frame 82 to slide along arms 90 and 92.

With the locking pin assembly 100 now released, backrest B is pivoted from the upright position to the substantially horizontal position as shown in FIG. 2 and moves forwardly relative to the base frame B. As backrest B pivots and moves forwardly, linkage bar 70 causes linkage bar 72 to move forward and upwardly thus raising extension E. As extension E is raised to its final position, linkage bar 80 rotates from a downwardly extending position to an upwardly extending position and that extension E moves in an arcuate path where its final resting place in the upright position at its highest point vertically.

The convertible chair C can be locked in the treatment table configuration as shown in FIG. 2 by reinsertion of locking pin 102 into one of the locking holes on one of arms 90 and 92.

Each arm rest 142 can be preferably removed from arm rest support tubes 140 by simply lifting each arm rest 142 which will cause the arm rest support rods 144 to slide out of arm rest support tubes 140.

The entire movable frame M may be raised and lowered by removing pins 46 from holes 44 and then reinserting them when the proper height is reached.

While this invention has been described as having a preferred embodiment, it is to be understood that it is capable of further modifications, uses and/or adaptations which follow in general the principle of the invention and including such departures from the present disclosure as come within known or customary practice in the art to which the invention pertains, and as may be applied to the central features hereinbefore set forth, and fall within the scope of the invention and the limits of the appended claims.

What I claim is:

1. A convertible wheelchair and treatment table, comprising:

a) supporting means for bearing a person in either a sitting or a supine position;

b) said supporting means having a base frame means and a moveable frame means;

c) said moveable frame means including backrest means pivotably mounted to said base frame means, and seat means supported by said base frame means and slidably mounted with respect thereto;

d) said seat means being slidable from a first position directly above said base frame means to a second position extending outwardly from said base frame means.

2. The convertible wheelchair of claim 1, wherein:

a) said movable frame means includes a locking assembly for preventing movement of said movable frame means relative to said base frame means; and, b) said locking means is releasable to allow movement of said movable frame means relative to said base frame means.

3. The convertible wheelchair of claim 2, wherein:

a) said base frame means includes wheel means thereon for rolling said supporting means and facilitating transportation of a person supported thereon from one location to another.

4. The convertible wheelchair of claim 3, wherein:

a) said base frame means includes vertical adjustment means for selectively positioning said movable frame means vertically from said wheel means.

5. The convertible wheelchair as defined in claim 4, further comprising:

a) a pair of removable arm rest means for supporting the arms of a person seated on said seat means.

6. The convertible wheelchair and treatment table as defined in claim 1, further comprising:

a) means for locking said seat means in said first position.

7. The convertible wheelchair and treatment table as defined in claim 6, further comprising:

a) armrest support means fixedly connected to said seat means and movable relative to said base frame means with said seat means.

8. The convertible wheelchair and treatment table as defined in claim 1, further comprising:

a) extension means pivotally mounted to said seat means for movement from a first stored position to a second extended position.

9. The convertible wheelchair and treatment table as defined in claim 8, further comprising:

a) means for locking said seat means in said first stored position and locking said extension means in said first stored position.

10. The convertible wheelchair and treatment table as defined in claim 1, further comprising:

a) extension means pivotably mounted to said seat means for movement from a first downwardly inclined position to a second substantially horizontally extending position.

11. The convertible wheel chair and treatment table as defined in claim 1, wherein:

a) said back rest means includes an inflatable portion thereon.

* * * * *